Aug. 25, 1936.  J. O. MADISON  2,051,958
ARTICULATED CAR CONSTRUCTION
Filed Feb. 10, 1931   3 Sheets—Sheet 1
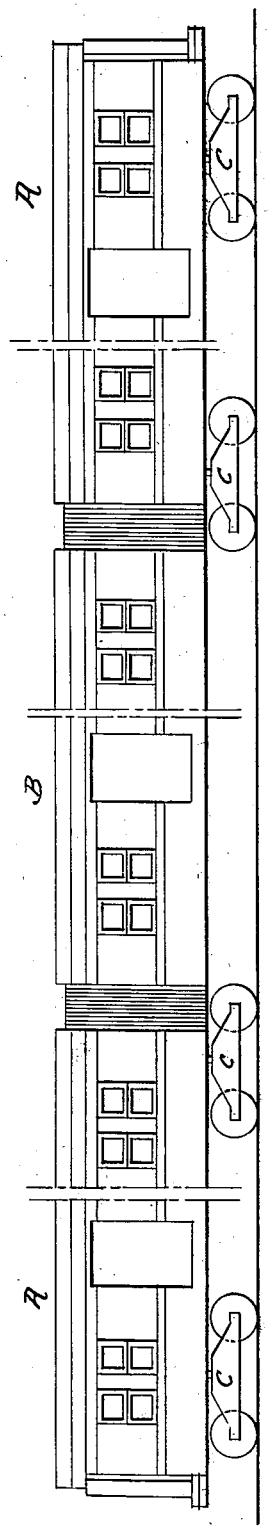
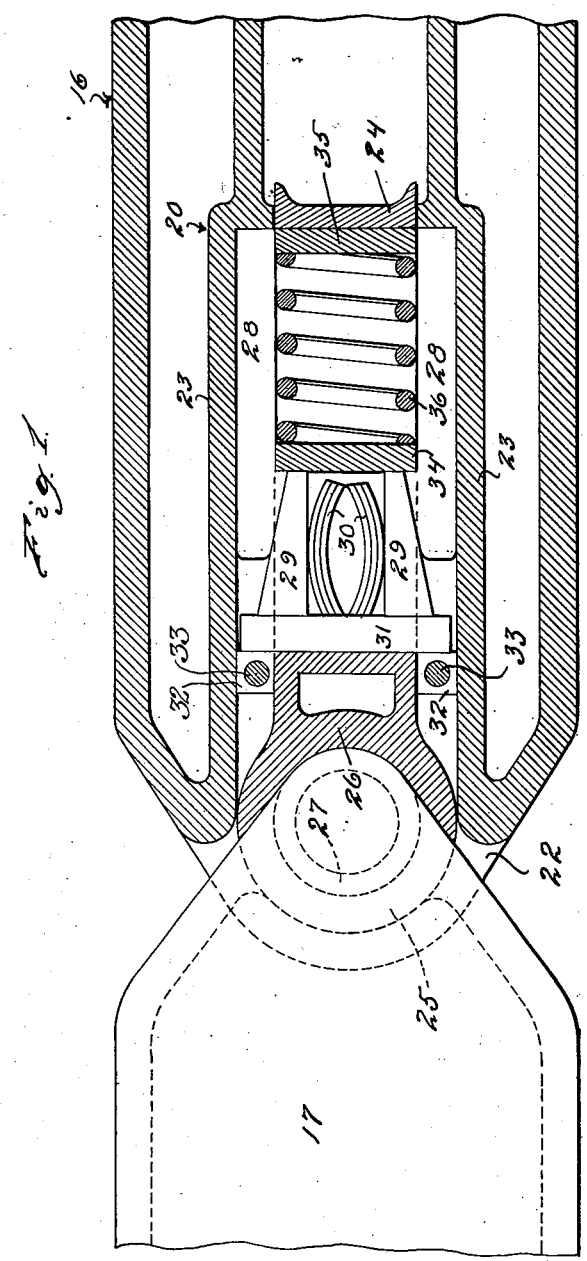
Inventor
John O. Madison
By
Attorney

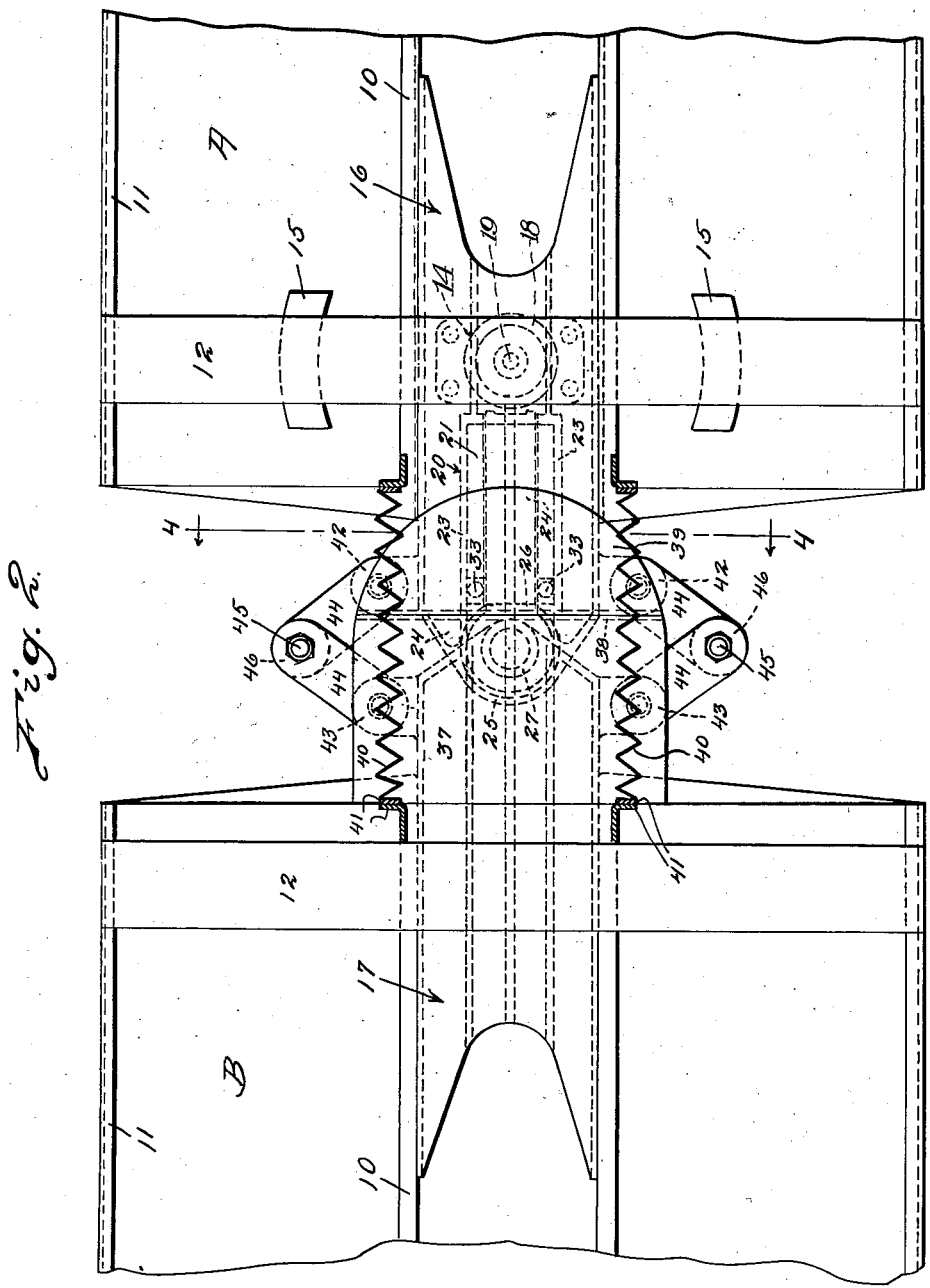

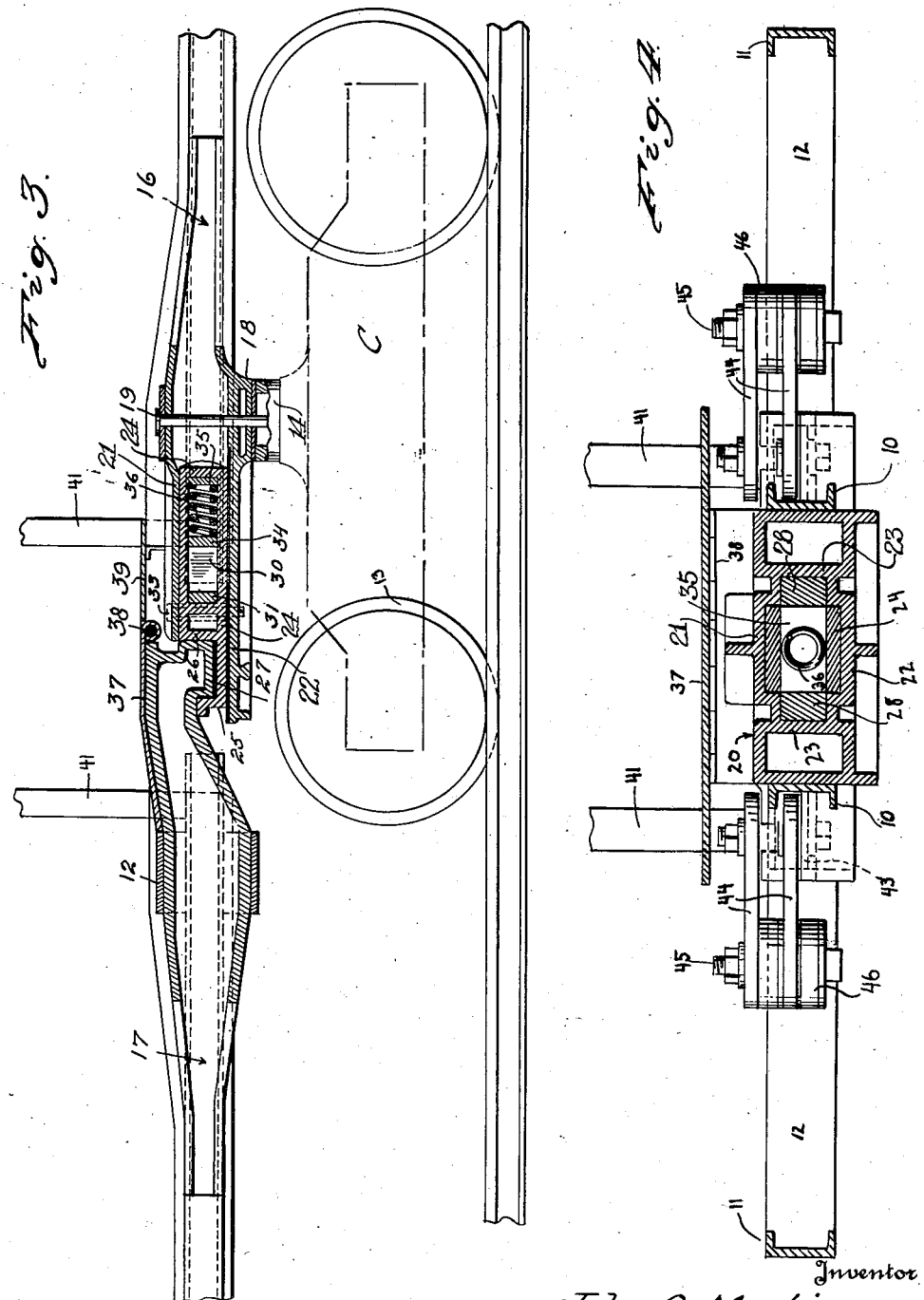

Patented Aug. 25, 1936

2,051,958

UNITED STATES PATENT OFFICE 2,051,958

ARTICULATED CAR CONSTRUCTION

John O. Madison, Brooklyn, N. Y.; Jennie M. Madison executrix of said John O. Madison, deceased Application February 10, 1931, Serial No. 514,865

20 Claims. (Cl. 105—3)

The invention relates to articulated cars and has for its principal object the provision of a novel construction and arrangement wherein the adjacent ends of car bodies are supported by a single truck which is mounted for swivelling movement but restrained against movement longitudinally of the car body or section to which it is secured.

Another object of the invention is to provide an articulated car embodying a plurality of car bodies or sections, the endmost sections being each provided with two trucks and the intermediate section being itself unprovided with trucks and simply supported by the end sections.

An important object of the invention is to provide an articulated car construction in which the adjacent ends of car bodies or sections are pivotally connected independently of the swivel connection or mounting of the one body or section with the truck.

Another important object of the invention is to provide an articulated car construction in which the adjacent ends of the car bodies or sections are not only pivotally connected but relatively longitudinally movable, means being furthermore provided for absorbing the shocks and jars incident to travel, particularly when starting and stopping so that the mechanism will be protected against undue strains.

Another object is to provide a construction in which there is a draft gear embodied in and forming a part of the connection between the adjacent car sections.

A further object is to provide a structure of this character in which the restraining of the truck against longitudinal movement with respect to the car section mounted directly upon it permits use of standard trucks, side bearings, center bearings and brake mechanism so that many difficulties connected with the latter existing in present practice will be avoided.

A still further object is to provide an articulated car in which use may be made of a bellows type of vestibule instead of the drum type.

Another object of the invention is to provide an articulated car equipped with safety links connecting the adjacent car sections and operable not only to provide a direct emergency connection in the event of failure of the draft gear or associated parts but also to reduce side sway particularly of the intermediate car section and consequently render the train more stable, particularly when entering upon or running off from curves.

An additional object is to provide a construction of this character which will be comparatively simple and inexpensive to make, assemble and install, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawings in which:

Figure 1 is a side elevation, with parts broken away of an articulated car constructed in accordance with the invention, Figure 2 is a plan view of one pivotal connection on a much larger scale, Figure 3 is a central vertical longitudinal section, Figure 4 is a cross section taken on substantially the line 4—4 of Figure 2, and Figure 5 is a fragmentary horizontal section illustrating the draft gear.

Referring more particularly to the drawings the letters A and B designate, respectively, end and intermediate car sections which are themselves of ordinary construction including center sills 10, side sills 11 and cross bearers 12. There may be other details as regards this car underframe construction but they are not material to an understanding of the present invention and are therefore neither illustrated nor described. It is intended that these adjacent car sections be supported upon a single truck C which is only diagrammatically illustrated as it may be of any standard type and does not constitute a part of the invention. The truck of course includes the usual wheels 13 and is provided with a center bearing 14. It is customary that such trucks have side bearing means thereon for cooperation with side bearing elements 15 on the car.

In carrying out my invention I provide coacting draft arms on the car sections indicated generally by the numerals 16 and 17 and operatively connected by a draft gear mechanism. The draft arm 16, conveniently formed as a single casting, is located between and suitably secured to the center sills 10 of the car section A and projects beyond the end thereof. At its underside this arm is provided with a center plate 18 rotatably engaged within the center bearing 14 on the truck so that swivelling movement of the car section with respect to the truck is permissible, there being, however, no longitudinal movement.

The customary king pin 19 preferably extends through the draft arm and center bearing and into the truck. At its end toward the end of the car the draft arm 16 has its outer end of rectangular formation to define a casing 20 including a top wall 21, a bottom plate or wall 22 and sides 23, this casing containing the draft gear to be described. The bottom wall 22 projects outwardly beyond the sides and top as clearly indicated in Figure 2 and constitutes supporting means for a yoke 24 here shown as of the vertical type and slidable within the casing. The outer end of this yoke is formed with a bearing socket 25 which is beyond the transverse wall 26.

The draft arm 17, conveniently formed as a single casting, is suitably secured between the center sills 18 of the car section B and projects beyond the end thereof, the projecting end being formed at its underside with a trunnion 27 rotatably engaged within the socket bearing 25. By this means it is apparent that the car sections are pivotally connected so as to have relative swivelling movement independently of any swivelling of the truck beneath the section A.

To avoid shocks and jars to the cars during travel, and particularly when starting or stopping, I provide a draft gear mechanism including the above described yoke 24 and comprising wedges 28 located within the casing 20 and engaging against the sides 23 thereof, these wedges coacting with inner wedges 29 urged apart by some suitable spring means such as the oppositely curved groups of plate springs 30. Within the yoke is a transverse follower 31 which, at the forward limit of its movement, engages against stops 32 located within the casing 20 and secured as by means of pins 33. This follower engages against the wedges 29 and these in turn bear against a spring follower 34. There may also be a follower 35 within the bight of the yoke, and interposed between the followers 34 and 35 is a spring 36. This is an ordinary type of draft gear and provides not only spring but also frictional resistance to movement of the yoke in either direction, that is to say either under buff or draft. By referring to Figure 3 it will be seen that the casing 20 is of such cross sectional shape as to provide adequate means for retaining and guiding the parts in their movement.

It will be noted that the draft arms 16 and 17 have their upper surfaces inclined upwardly toward the axis of the relatively movable car sections, thus providing a species of runway. The center sills are also correspondingly shaped so that whatever floor is provided will clear the means connecting the car sections. On account of the relative movement of the car sections it is impossible to have the floor rigid and at the juncture of the sections I have consequently disclosed a rigid plate 37 to which is hinged at 38 a plate section 39 which will bridge the necessary gap.

With an articulated car constructed in this manner it is not necessary to use a drum type of vestibule and I have consequently disclosed in Figure 1 a bellows vestibule 40 which may be of conventional construction with its edges or ends suitably secured to or between vertical bars 41 at the ends of the car sections.

As a safety factor, I prefer to provide positive means for flexibly connecting the sections irrespective of the draft gear connection above described. To carry this out I form or otherwise provide the draft arms 16 and 17 with outstanding ears 42 and 43 respectively to which are pivoted links 44 which have their adjacent ends pivotally connected at 45. Obviously these links will not in any way interfere with the relative longitudinal movement or the pivotal movement of the car sections and they come into play only in case of failure of the draft gear. In this manner it is apparent that any accidental disconnection of the car sections is prevented. I also utilize these safety links as means for stabilizing the intermediate car section and preventing it from weaving or swaying to an objectionable extent as it tends to do when running onto or off from curves. I accomplish this by providing relatively thick rubber disks or washers 46 between the outer ends of the links. These links with the washers will permit freedom of movement of the car sections horizontally and a limited vertical movement but will prevent the middle section, in case there are three or more, from tipping sideways or lurching on curves at high speeds.

In an articulated car constructed in this manner it is apparent that only one truck is needed for supporting the adjacent ends of two sections. When there is any tendency of the car sections to move relatively in a longitudinal direction, the yoke 24 will move in one direction or the other and this will cause the application of pressure against the wedges 29 accompanied by compression of the spring 36. The result is that friction is developed between the wedges 29 as they rub against the wedges 28 and this friction combined with the spring resistance will clearly operate to absorb any shocks or jars. A feature of importance is that the pivotal connection of the car sections is independent of the pivotal mounting of one section upon the truck. This means that the standard type of truck, side bearings and center bearings can be used and that there will be no difficulty experienced with the brake mechanism as there would be if the truck were capable of longitudinal movement with respect to the car section beneath which it is mounted.

From the foregoing description and a study of the drawings it will be apparent that I have thus provided a mechanism which adequately fulfills all the purposes for which it is intended. By means of my construction and arrangement it is evident that it is possible to construct an articulated car or train by using two end sections each equipped with two trucks, and an intermediate section which is itself unprovided with any trucks and which is simply hung between the end sections. It is thought that the construction, operation and advantages should be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In an articulated car, end sections each mounted on a pair of trucks, and an intermediate section unprovided with trucks suspended between said end sections, and means yieldably resisting relative longitudinal movement of the sections.

2. In an articulated car, end sections each provided with trucks, bearing members on each end section, an intermediate section, means carried by said intermediate section pivotally engaged with said bearing members independently of the mounting of said trucks, and yieldable resistance means on the end sections engaging the bearing members for opposing relative longitudinal movement of the sections.

3. In an articulated car, end sections each provided with swivelled trucks, an intermediate section unprovided with trucks, bearing means on the end sections at the ends thereof toward the intermediate section, means on the ends of said intermediate section pivotally engaged with said bearing means independently of the swivelling of the truck, and means yieldably resisting relative longitudinal movement of all the sections.

4. In an articulated car, end sections having trucks and provided at their ends with bearing means independent of the trucks, an intermediate section provided at its ends with means pivotally engaging said bearing means, and a draft gear connected with each of said bearing means for yieldably opposing relative longitudinal movement of the sections.

5. In an articulated car, end sections mounted on trucks, an intermediate section unprovided with trucks, means for suspending the intermediate section between the end sections, and draft gears carried by the end sections and connected with said suspension means.

6. In an articulated car, car sections, a truck swivelled beneath the end of one section, a draft arm carried by said section and formed to provide a casing, a draft gear within said casing having a projecting member formed as a bearing, and a draft arm carried by the other section and pivotally engaged with said bearing.

7. In an articulated car, car sections, a truck mounted beneath one section, a draft arm carried by said section and formed to provide a casing, a yoke slidable within said casing and having a projecting portion formed with a bearing, spring and friction means opposing movement of said yoke in either direction, and a draft arm carried by the other section and pivotally engaged within said bearing.

8. In an articulated car, car sections, a truck pivoted beneath one section, a draft arm carried by said section, a draft gear mounted in said draft arm and having a projecting portion formed as a bearing, a draft arm secured to the other section and pivotally engaged within said bearing, said sections being capable of relative pivotal movement about an axis independent of the axis of the truck, and said sections having relative longitudinal movement opposed by said draft gear.

9. In an articulated car, a section provided with a truck, a second section, draft gear means connecting said sections independently of the truck whereby they may have relative longitudinal movement opposed by yielding resistance, and other means connecting said sections and capable of becoming effective upon failure of the draft gear.

10. In an articulated car, a section provided with a truck, a second section, draft gear means connecting said sections independently of the truck whereby they may have relative longitudinal movement opposed by yielding resistance, and other means connecting said sections and capable of becoming effective upon failure of the draft gear comprising links pivotally connected with one another and pivotally connected with said sections.

11. In an articulated car, a section provided with a truck, a second section, draft gear means connecting said sections independently of the truck whereby they may have relative longitudinal movement opposed by yielding resistance, and other means connecting said sections and capable of becoming effective upon failure of the draft gear and operable to stabilize the second named section and prevent lurching thereof when rounding curves.

12. In an articulated car, end sections equipped with trucks, an intermediate section unprovided with trucks, draft gear means pivotally supporting said intermediate section between the end sections whereby the sections may have yieldingly resisted longitudinal movement, and auxiliary means connected with the ends of the adjacent sections to become effective upon failure of the draft gear means.

13. In an articulated car, end sections equipped with trucks, an intermediate section unprovided with trucks, draft gear means pivotally supporting said intermediate section between the end sections whereby the sections may have yieldingly resisted longitudinal movement, and auxiliary means connected with the ends of the adjacent sections to become effective upon failure of the draft gear means, said last named means also operating to stabilize the intermediate section with respect to the end sections and prevent lurching thereof when rounding curves.

14. In an articulated car, end sections equipped with trucks, an intermediate section, means including draft gears for pivotally mounting the intermediate section between said end sections, and other means connecting the intermediate section with the end sections and projecting laterally to serve as stabilizing means for the intermediate section.

15. In an articulated car, end sections equipped with trucks, an intermediate section, means including shaft gears pivotally mounting the intermediate section between the end sections, and pairs of links pivoted upon the adjacent ends of the sections and having their outer ends pivotally connected with each other, said links constituting an auxiliary and emergency connection between the sections and serving as stabilizing means for the intermediate section.

16. In an articulated car, car sections, supporting trucks swiveled beneath certain of the sections, and means for suspending an intermediate section between adjacent sections embodying co-acting bearing members, and spring and friction means associated with said bearing members for yieldably opposing relative longitudinal movement of the sections.

17. An articulated car comprising a plurality of sections, trunnion means mounted on one section, bearing means on the adjacent section rotatably receiving said trunnion means, one of said means being rigid on the section carrying it, and means connected with the other of said means for resiliently opposing movement of the assembled means with respect to the sections.

18. An articulated car comprising a plurality of sections, trunnion means carried by one section, bearing means carried by the adjacent section, one of said means being rigid with respect to the section carrying it and the other of said means being slidable with respect to the section carrying it, said trunnion means and bearing means being assembled for relative pivotal movement, and means carried by one section for yieldably opposing relative movement of the assembled means with respect to the sections.

19. An articulated car comprising a plurality of sections, a truck located beneath the end of one section and swivelly connected therewith, pivot means carried by one car section, bearing means carried by the other car section and pivotally connected with said pivot means, one of said means being rigid with respect to the car section carrying it and the other of said means being slidable with respect to the section carrying it, both of said means being spaced, longitudinally of the car, from said swivel connection of the truck, said pivot means and bearing means being assembled for relative pivotal movement independently of swivelling movement of the truck, and means carried by one section for yieldably opposing relative movement of the assembled pivot and bearing means with respect to the sections.

20. An articulated car comprising a plurality of sections, a truck swivelly mounted beneath one of the sections, a pivotal connection between the sections located at a point spaced longitudinally from the pivotal mounting of the truck, said pivotal connection comprising a pair of pivotally connected members, one member being rigid with respect to one section and the other being slidable with respect to the adjacent section, and means for resiliently opposing movement of the slidable member.

JOHN O. MADISON.